(12) United States Patent
Koketsu et al.

(10) Patent No.: US 10,302,125 B2
(45) Date of Patent: May 28, 2019

(54) SLIDING MEMBER AND SLIDING MECHANISM

(71) Applicant: CANON KABUSHIKI KAISHA, Tokyo (JP)

(72) Inventors: Naoyuki Koketsu, Komae (JP); Tetsuo Hino, Yamato (JP); Kenji Takashima, Numazu (JP); Akiko Takei, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/537,660

(22) PCT Filed: Mar. 2, 2016

(86) PCT No.: PCT/JP2016/057257
§ 371 (c)(1),
(2) Date: Jun. 19, 2017

(87) PCT Pub. No.: WO2016/147964
PCT Pub. Date: Sep. 22, 2016

(65) Prior Publication Data
US 2018/0274585 A1    Sep. 27, 2018

(30) Foreign Application Priority Data

Mar. 13, 2015    (JP) .................... 2015-050477

(51) Int. Cl.
*F16C 17/18*    (2006.01)
*F16C 17/02*    (2006.01)
(Continued)

(52) U.S. Cl.
CPC .............. *F16C 17/02* (2013.01); *F16C 17/18* (2013.01); *F16C 33/043* (2013.01);
(Continued)

(58) Field of Classification Search
CPC ........................................... F16C 17/18
See application file for complete search history.

(56) References Cited

U.S. PATENT DOCUMENTS 5,885,006 A *    3/1999    Sheedy ................... F16C 17/02
                                                    384/192
7,703,432 B2 *   4/2010    Shaffer ..................... F16C 9/04
                                                    123/197.4
(Continued)

FOREIGN PATENT DOCUMENTS

JP    59-110918 A    6/1984
JP    6-58328 A      3/1994
(Continued)

OTHER PUBLICATIONS

Machine Translation of JP 59-110918.*

*Primary Examiner* — Thomas R Hannon
(74) *Attorney, Agent, or Firm* — Venable LLP

(57) ABSTRACT

Provided is a sliding member, which is reduced in friction under sliding conditions of high load and high speed under an oilless condition, and is excellent in wear resistance. The sliding member includes: a shaft; and at least one intervening member, in which: the at least one intervening member is located between the shaft and a bearing, and is operable independently of the shaft; and at least one surface of the at least one intervening member on a shaft side includes a sliding surface under one of a radial load and an axial load.

10 Claims, 3 Drawing Sheets

(51) Int. Cl.
    *F16C 33/04*         (2006.01)
    *F16C 33/10*         (2006.01)
    *F16C 33/16*         (2006.01)
    *F16C 33/20*         (2006.01)

(52) U.S. Cl.
    CPC .......... *F16C 33/1095* (2013.01); *F16C 33/16* (2013.01); *F16C 33/20* (2013.01); *F16C 33/203* (2013.01); *F16C 33/208* (2013.01); *F16C 2202/50* (2013.01); *F16C 2208/58* (2013.01); *F16C 2208/60* (2013.01); *F16C 2208/66* (2013.01); *F16C 2208/78* (2013.01)

(56) References Cited

U.S. PATENT DOCUMENTS

| | | | |
|---|---|---|---|
| 9,470,265 B2 * | 10/2016 | Lueck | F16C 17/02 |
| 2012/0224985 A1 * | 9/2012 | Forsberg | E21B 43/128 |
| | | | 417/410.1 |
| 2015/0204383 A1 | 7/2015 | Ishii et al. | |
| 2015/0330442 A1 | 11/2015 | Futae et al. | |

FOREIGN PATENT DOCUMENTS

| | | |
|---|---|---|
| JP | 2013-204646 A | 10/2013 |
| WO | 2014/97417 A1 | 6/2014 |

* cited by examiner

SLIDING MEMBER AND SLIDING MECHANISM

TECHNICAL FIELD

The present invention relates to a sliding member and a sliding mechanism.

BACKGROUND ART

A plain bearing is a bearing in which friction is reduced through low resistant sliding between a surface of the bearing and a surface of a sliding body brought into contact with the surface of the bearing. A lubricant is often used in order to achieve a reduction in friction, and an oil, grease, or the like is used by being applied to a sliding interface. However, the oil or grease to be applied causes, for example, scattering contamination, such as dripping or leaking of a liquid, or an increase in friction coefficient resulting from a shortage of the liquid. Therefore, it is difficult to obtain a stable friction coefficient for a long period of time. Under such circumstances, a material having a self-lubricating property not requiring the oil or grease has attracted attention. A self-lubricating material is a material exhibiting lubricating characteristics by itself without the need for external addition. Typical examples thereof include, as resin materials, polyacetal (POM), polyethylene (PE), and polytetrafluoroethylene (PTFE). Those resin materials are molded and used as the bearing. In addition, the self-lubricating material is often used in combination with the lubricant through addition of the oil or grease.

PV characteristics are often used as a reference for selecting many existing bearing materials. This is a value represented by a product of a sliding speed V and a load P, which serve as the use conditions of a bearing, and it is necessary to use the bearing within its allowable PV value specific to its material. In addition, the bearing also has an allowable speed and an allowable load, which are each known as a parameter required for selection of the material of the bearing as a value specific to the material. In use under the conditions of high speed and high load in consideration of the allowable speed and allowable load, an ultrahigh molecular resin material, for example, polyether ether ketone (PEEK) or the like is used as a hard material. However, a material having a wide allowable PV value range has a high friction coefficient, and there is a limit to reducing friction. On the other hand, as a material having a low friction coefficient, there is given PTFE. However, PTFE has a narrow allowable PV value range and suffers a large amount of wear when used under high load, with the result that stable friction is not obtained. Such wear is more remarkable in use in an oilless state, and hence an oil is generally used in combination.

In addition, an additive material has been mixed with the material having a low friction coefficient to increase its hardness and widen its allowable PV value range. In this case, a glass filler, a fiber, or the like is used as the additive material. However, at present, such additive material causes an increase in friction coefficient and low friction cannot be maintained. In view of the foregoing, in PTL 1, an investigation has been made on film formation and molding of a resin material on a surface of a metal member.

The technology of PTL 1 provides an improving effect on the allowable load by virtue of an influence of the metal member, but a sliding surface is formed of the original resin material and hence improvement in wear resistance is insufficient. It is hard to say that the allowable speed is sufficiently improved.

As described above, the material having a wide allowable PV value range has a high friction coefficient, and the material having a low friction coefficient has a narrow allowable PV value range. Therefore, there is a demand for a configuration or material having a wide allowable PV value range and a low friction coefficient. Further, in recent years, the demand for high functionalization, compactification, and energy saving has led to severer conditions of the sliding speed V and the load P. However, at present, no plain bearing material has a PV value with which the bearing can respond at high speed under high load in an oilless state.

CITATION LIST

Patent Literature

PTL 1: Japanese Patent Application Laid-Open No. 2013-204646

SUMMARY OF INVENTION

Technical Problem

The present invention provides a sliding member and a sliding mechanism which are reduced in friction under the sliding conditions of high load and high speed under an oilless condition, and are excellent in wear resistance, and a conveying apparatus including the same.

Solution to Problem

According to one embodiment of the present invention, there is provided a sliding member, including: a shaft; and at least one intervening member, in which: the at least one intervening member is located between the shaft and a bearing, and is operable independently of the shaft; and at least one surface of the at least one intervening member on a shaft side includes an oilless sliding surface under one of a radial load and an axial load.

According to another embodiment of the present invention, there is provided a sliding member, including: a shaft; and two or more intervening members, in which: the two or more intervening members are each located between the shaft and a bearing, and are each operable independently of the shaft; and at least one surface of the two or more intervening members on a shaft side includes a sliding surface under one of a radial load and an axial load.

According to still another embodiment of the present invention, there is provided a sliding mechanism, including: the sliding member according to the one embodiment of the present invention; and a bearing for supporting the sliding member, in which the sliding member is configured to slide with respect to the bearing.

Advantageous Effects of Invention

According to the embodiments of the present invention, the sliding member and the sliding mechanism which are reduced in friction under the sliding conditions of high load and high speed under an oilless condition, and are excellent in wear resistance can be provided.

Further features of the present invention will become apparent from the following description of exemplary embodiments with reference to the attached drawings.

DESCRIPTION OF EMBODIMENTS

The present invention is described in detail below by describing embodiments of the present invention.

Figure 1A:
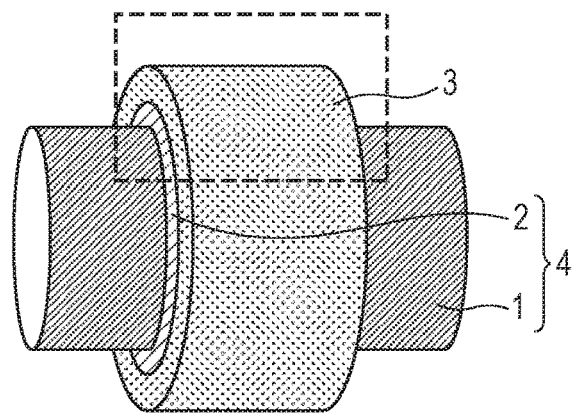
FIG. 1A, FIG. 1B, FIG. 1C, and FIG. 1D are views for illustrating an example of a sliding mechanism of the present invention.
Figure 1B:
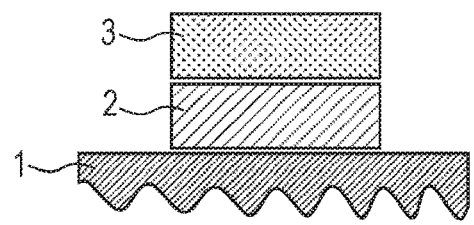
Figure 1C:
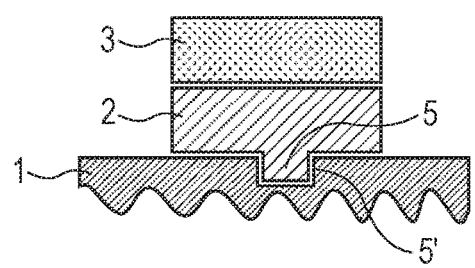
Figure 1D:
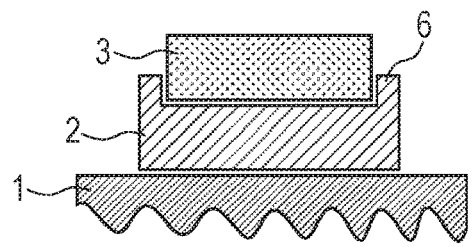

FIG. 1A to FIG. 1D are views for illustrating an example of a sliding mechanism of the present invention. FIG. 1A is a schematic perspective view, and FIG. 1B to FIG. 1D are each a sectional view of a portion enclosed by the dotted line in FIG. 1A in a plane parallel to the drawing sheet.

The sliding mechanism illustrated in FIG. 1A includes: a sliding member 4; and a bearing 3 for supporting the sliding member 4, and the sliding member 4 is configured to slide with respect to the bearing 3. The sliding member 4 includes: a shaft 1; and at least one intervening member 2, in the example illustrated in FIG. 1A to FIG. 1D, one intervening member 2. The shaft 1 is a rotary shaft configured to rotate about its shaft center. The intervening member 2 is located between the shaft 1 and the bearing 3, and is operable, in the example illustrated in FIG. 1A to FIG. 1D, is rotatable, independently of the shaft 1. In addition, a surface of the intervening member 2 on a shaft 1 side is a sliding surface under a radial load acting in a direction vertical to the shaft 1. Therefore, the intervening member 2 is configured to rotate in the same direction as the shaft 1 and slide with respect to the shaft 1 and the bearing 3 under a radial load.

<Shaft 1>

The shaft 1 is a rotary shaft in FIG. 1A to FIG. 1D, but is not limited thereto. The shaft 1 may be a rocking shaft configured to pivot with respect to a bearing, or a slide shaft configured to reciprocate with respect to the bearing.

The shape of the shaft 1 is a cylindrical shape in FIG. 1A to FIG. 1D, but is not particularly limited. For example, the shaft 1 may have a hollow tubular shape. In addition, the surface of the shaft 1 may be subjected to surface processing for forming, for example, fine irregularities having a striped pattern, a dotted pattern, or the like.

A material for forming the shaft 1 is not particularly limited, and examples thereof include a metal, a resin, and ceramics. However, in consideration of the use conditions of high load, a hard material is preferred, and a SUS material, a SUM material, and the like are preferred.

In order to prevent corrosion and oxidation, the surface of the shaft 1 may be subjected to surface treatment, for example, plating such as Ni plating, Cr plating, gold plating, silver plating, copper plating, and zinc plating, or thermal spraying of an alloy or ceramics. A material to be used for the surface treatment is not necessarily a single substance. Different kinds of substances may be present in a scattered manner, or different kinds of materials may be formed on the pattern.

<Intervening Member 2>

The intervening member 2 is a member which is located between the shaft 1 and the bearing 3, and prevents the shaft 1 from being brought into contact with the bearing 3. The intervening member 2 is not fixed to the shaft 1, and is rotatable independently of the shaft 1. In addition, the intervening member 2 is not fixed to the bearing 3, and is rotatable independently of the bearing 3. Further, the surface of the intervening member 2 on the shaft 1 side is a sliding surface under a radial load, and the intervening member 2 is configured to rotate in the same direction as the shaft 1 and slide with respect to the shaft 1 and the bearing 3 under a radial load. Therefore, when a relative speed between the shaft 1 and the bearing 3 is defined as $V_0$, a relative speed between the shaft 1 and the intervening member 2 is defined as $V_1$, and a relative speed between the intervening member 2 and the bearing 3 is defined as $V_2$, the relationship $V_0=V_1+V_2$ (where $V_1, V_2>0$) is established.

When the intervening member 2 is not provided and the shaft 1 is configured to slide while being brought into contact with the bearing 3, the allowable PV value of the bearing 3 needs to be considered with $V_0$, and hence a load P is limited. When a used load is higher than the limited load P, the allowable PV value of the bearing 3 is exceeded, and hence it is necessary to change the bearing 3 and select a material withstanding higher load and higher speed. However, as described above, few materials usable at high speed under high load exhibit low friction at present.

In the present invention, the intervening member 2 is provided, and hence $V_0$ can be considered by being divided into $V_1$ and $V_2$, which enables a local reduction in speed V in the PV value. Therefore, the bearing 3 can be used even under the conditions in which the allowable PV value of the bearing 3 is exceeded as the entirety of the sliding member. That is, a material exhibiting low friction can be selected even when the allowable PV value has a narrow range.

Further, when the intervening member 2 is provided, the sliding member 4 has formed therein a sliding surface other than a sliding surface with respect to the bearing 3 (a surface of the intervening member 2 on a bearing 3 side), and thus includes a plurality of sliding surfaces. Therefore, even when some of the sliding surfaces are increased in friction coefficient owing to some cause, other sliding surfaces slide, and hence an abrupt increase in friction is suppressed as the entirety of the sliding member 4, and a stable friction coefficient is obtained.

A material for forming the intervening member 2 is not particularly limited, and examples thereof include a metal, a resin, and ceramics. Examples of the resin include engineering plastics such as polyether ether ketone (PEEK), polyacetal (POM), polytetrafluoroethylene (PTFE), polyethylene (PE), polyamide (PA), polyimide (PI), and polyphenylene sulfide (PPS). Examples of the metal include SUS, SUM, Cu, Al, and Ag. The material for forming the intervening member 2 is preferably a self-lubricating material, which exhibits a self-lubricating property. Examples of such self-lubricating material include: resins such as POM, PTFE, PE, PA, PI, and PPS; and metals such as soft metals, e.g., Cu, Al, and Ag. In addition, the following resin may also be used: the resin mixed with a glass filler, graphite, or a fluororesin, the resin mixed with oil or grease, or the resin mixed with both of the materials. One kind of those materials may be used alone, or two or more kinds thereof may be used as a mixture.

In addition, the material may be subjected to surface coating. A specific example thereof is the metal material of the SUS base material, Al base material, or the like having a film formed on one surface or both surfaces thereof and formed of a solid lubricant, such as diamond-like carbon (DLC), $WS_2$, $MoS_2$, graphite, POM, PTFE, or PE. The surface coating may be film formation with a pattern having a periodic structure, and a film may be formed by mixing a plurality of kinds of solid lubricants.

In order to prevent a situation in which the intervening member 2 rotates integrally with the shaft 1 without sliding with respect to the shaft 1, it is preferred that a material for forming the sliding surface (the surface of the intervening member 2 on the shaft 1 side) be different from a material for forming a surface facing the sliding surface (the surface of the shaft 1), or that a friction coefficient on the sliding surface be different from a friction coefficient on the surface facing the sliding surface. In addition, in order not to suppress the rotation of the intervening member 2 by the bearing 3, it is preferred that a material for forming the sliding member 4 on a surface facing the bearing 3 (the surface of the intervening member 2 on the bearing 3 side) be different from a material for forming the bearing 3 on a surface facing the sliding member 4, or that the friction coefficient of the sliding member 4 on the surface facing the bearing 3 be different from the friction coefficient of the bearing 3 on the surface facing the sliding member 4.

The shape of the intervening member 2 is a tubular shape covering the shaft 1 in a circumferential direction in FIG. 1A to FIG. 1D, but is not particularly limited. The intervening member 2 may have a flat surface as illustrated in FIG. 1B, but it is also appropriate that the intervening member 2 be subjected to surface processing for forming, for example, fine irregularities having a striped pattern, a dotted pattern, or the like, or have a plurality of holes on its side surface. In addition, as illustrated in FIG. 1C, the intervening member 2 may include a convex portion 5 on the surface on the shaft 1 side. In this case, in order to prevent a load from concentrating only on the convex portion 5, the shaft 1 preferably includes a concave portion 5' in which the convex portion 5 is fitted. In addition, in a state in which the convex portion 5 is fitted in the concave portion 5' with no gap, there is a risk in that the intervening member 2 rotates integrally with the shaft 1 without sliding with respect to the shaft 1, and $V_1$ becomes 0. Therefore, it is preferred that play exist, and the width of the convex portion 5' be larger than that of the concave portion 5. In addition, as illustrated in FIG. 1D, the intervening member 2 may include, on both ends, flange portions 6 projecting on the bearing 3 side. It is also appropriate to form the flange portion 6 on one end or in the whole or part of the end in a circumferential direction, or form a plurality of flange portions 6 so as to be apart from each other in the circumferential direction. In the case of forming the flange portions 6 on both the ends, it is preferred to form a gap between the flange portions 6 and the bearing 3. In the case of forming the flange portion 6 without a gap, there is a risk in that the bearing 3 and the intervening member 2 are fixed to each other, rotation of the intervening member 2 is suppressed, $V_2$ becomes 0, and the effects of the present invention are not obtained.

The inner diameter of the intervening member 2 is preferably from 100.5% to 110% with respect to the outer diameter of the shaft 1. When the diameters fall within such range, a gap is formed between the intervening member 2 and the shaft 1, and a situation in which the intervening member 2 rotates integrally with the shaft 1 without sliding with respect to the shaft 1 is prevented. In addition, the outer diameter of the intervening member 2 is preferably from 80% to 99.95% with respect to the inner diameter of the bearing 3. When the diameters fall within such range, a situation in which rotation of the intervening member 2 is suppressed by the bearing 3 can be prevented. The inner diameter of the intervening member 2 is preferably 50 mm or less. The use of an intervening member having an inner diameter of more than 50 mm increases a gap, and thus reduces the ratio of a contact portion, with the result that the effects of the present invention are difficult to obtain. In addition, the thickness of the intervening member 2 is preferably 10 mm or less, and a smaller thickness is more preferred.

Figure 2A:
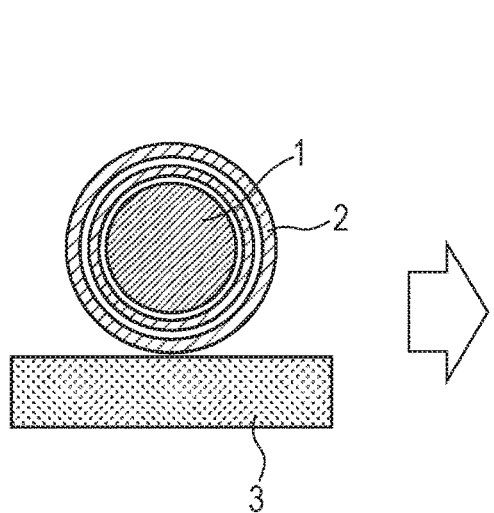
FIG. 2A and FIG. 2B are views for illustrating another example of the sliding mechanism of the present invention.
Figure 2B:
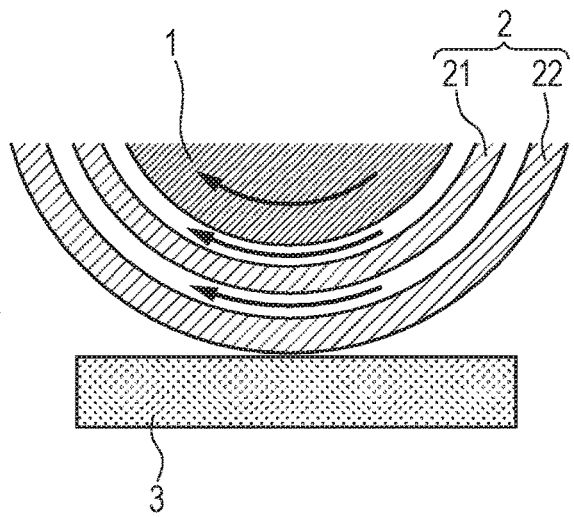

FIG. 2A and FIG. 2B are views for illustrating another example of the sliding mechanism of the present invention. FIG. 2A is a sectional view in a plane vertical to the shaft 1, and FIG. 2B is a partial enlarged view of FIG. 2A. The sliding mechanism illustrated in FIG. 2A and FIG. 2B includes an intervening member A 21 and an intervening member B in the stated order from the shaft 1 side. The intervening member A 21 and the intervening member B 22 are rotatable independently of each other, and are each configured to rotate in the same direction as the shaft 1 under a radial load. In addition, at least one of a surface of the intervening member A 21 on the shaft 1 side or a surface of the intervening member B 22 on the shaft 1 side is a sliding surface under a radial load. For example, in the case where the surface of the intervening member A 21 on the shaft 1 side is a sliding surface, the intervening member A 21 is configured to slide with respect to the shaft 1 and the intervening member B 22 is configured to slide with respect to the bearing 3 under a radial load. The surface of the intervening member B 22 on the shaft 1 side may be a sliding surface or may not be the sliding surface under a radial load. That is, the intervening member B 22 may be configured to slide with respect to the intervening member A 21, or may be configured to rotate integrally with the intervening member A 21 without sliding with respect to the intervening member A 21. That is, when a relative speed between the intervening member A 21 and the intervening member B 22 is defined as $V_3$, the relationship $V_3 \geq 0$ is established. It should be noted that, under the conditions of such high load that the allowable PV value is exceeded even when $V_0$ is divided into $V_1$ and $V_2$, it is preferred that the surface of the intervening member B 22 on the shaft 1 side be a sliding surface under a radial load, that is, the intervening member B 22 be configured to slide with respect to the intervening member A 21 and the relationship $V_3 > 0$ be established. In order to allow the intervening member B 22 to slide with respect to the intervening member A 21, it is preferred that a material for forming the intervening member A 21 on a surface facing the intervening member B 22 be different from a material for forming the intervening member B 22 on a surface facing the intervening member A 21, or that the friction coefficient of the intervening member A 21 on the surface facing the intervening member B 22 be different from the friction coefficient of the intervening member B 22 on the surface facing the intervening member A 21.

It is also appropriate to form three or more layers or four or more layers of intervening members 2. In the case of forming three layers, a layer of an intervening member C may be added between the intervening member A 21 and the intervening member B 22 of the sliding mechanism illustrated in FIG. 2A and FIG. 2B. In this case, when relative speeds between: the intervening member C added; and the intervening member A 21 and the intervening member B 22 are defined as $V_{2C}$ and $V_{3C}$, respectively, the relationship $V_{2C}$, $V_{3C} > 0$ is preferably established. In this case, it is preferred that, in the intervening member C, a material for forming a sliding surface with respect to the intervening member A be different from a material for forming a sliding surface with respect to the intervening member B. In addition, in the case of adding the intervening member C, it is acceptable that the intervening member A and the intervening member B be formed of the same material when the materials of the sliding surfaces of the intervening member C are different from each other.

<Bearing 3>

The bearing 3 is a member for supporting the shaft 1 through the intervening member 2, and is a member to be used by being fixed to a framework, a housing, or the like.

The shape of the bearing 3 is a tubular shape covering the intervening member 2 in a circumferential direction in FIG. 1A to FIG. 1D and a flat plate shape in FIG. 2A and FIG. 2B, but is not particularly limited. For example, a semi-cylindrical shape, a shape having a curvature, or the like may be adopted. The shape of the bearing 3 is appropriately determined in accordance with the shape of the intervening member 2, and is selected in view of the degree of freedom of the shaft 1 in consideration of a load because the load changes a contact area. In addition, in order to support the shaft 1, a plurality of bearings 3 may be provided to be dispersedly arranged at several positions. In addition, the surface of the bearing 3 brought into contact with the intervening member 2 may be subjected to surface processing for forming, for example, fine irregularities having a striped pattern, a dotted pattern, or the like.

A material for forming the bearing 3 is generally selected and determined depending on the use conditions of the load (P) and the speed (V), and the material of the intervening member 2. The material for forming the bearing 3 is not particularly limited, and examples thereof include a metal, a resin, and ceramics. A hard material having less strain under high load is preferred. In addition, a material having good moldability is preferably used for fixation to a framework, a housing, or the like. Examples of the resin include engineering plastics such as PEEK, POM, PTFE, PE, PA, PI, and PPS. Examples of the metal include SUS, SUM, Cu, Al, and Ag. In addition, the material may be the metal material having a resin layer formed on its surface.

In order to prevent corrosion and oxidation, the surface of the bearing 3 brought into contact with the intervening member 2 may be subjected to surface treatment, for example, plating such as Ni plating, Cr plating, gold plating, silver plating, copper plating, and zinc plating, or thermal spraying of an alloy or ceramics. In addition, the metal material and the resin material may be mixed and dispersed to form a film in which different kinds of materials are present in a scattered manner.

The present invention has been described above by taking as examples the sliding member and sliding mechanism in which the surface of the intervening member 2 on the shaft 1 side is a sliding surface under a radial load. However, the present invention can be applied to a sliding member and sliding mechanism in which the surface of the intervening member 2 on the shaft 1 side is a sliding surface under an axial load.

The sliding mechanism of the present invention can be used in an oilless state. Therefore, the sliding mechanism does not require an oil tank for retaining an oil or an external mechanism for adding the oil in drops. In addition, the sliding mechanism does not require a shielding mechanism for preventing scattering or leaking of the oil.

Figure 4:
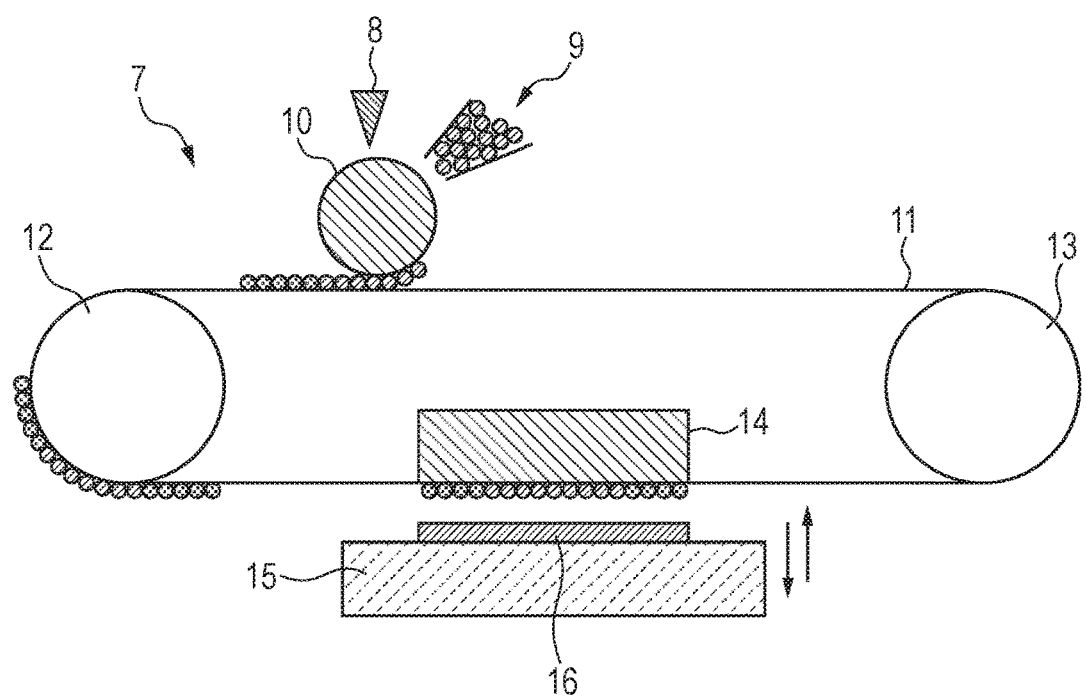
FIG. 4 is a view for illustrating an example of a conveying apparatus of the present invention.

The sliding mechanism according to the embodiments of the present invention can be applied to an apparatus including a conveying mechanism, such as a 2D or 3D printer. As an example of such apparatus, a configuration of a 3D printer 7 utilizing an electrophotographic system is schematically illustrated in FIG. 4. The 3D printer 7 according to an embodiment of the present invention is configured to form a three-dimensional article through the following process. First, a laser 8 is radiated to an intermediate transfer drum 10, to form a latent image of a slice image of the article on the intermediate transfer drum 10. An article forming material is supplied from a container 9 for accommodating the article forming material to the transfer drum 10, and thereby a slice image of the article forming material is formed on the transfer drum 10. The formed slice image is transferred from the transfer drum 10 to a convey belt 11, and conveyed to a work holding portion 15 by rotation of convey rollers 12 and 13.

The slice image of the article forming material is thermally fused onto an intermediate laminate 16 with a thermal pressure bonding unit 14 through the convey belt 11, and the intermediate laminates 16 are laminated sequentially to form the three-dimensional article.

The 3D printer 7 includes the convey rollers (12, 13) and the convey belt 11 as a conveying mechanism for the slice image, and may use the sliding mechanism of the present invention for bearing portions of the convey rollers (12, 13).

In addition, the sliding mechanism of the embodiments of the present invention can be applied to one configured to convey an article through utilization of rotation of the shaft of the sliding mechanism: a bearing portion of the intermediate transfer drum 10 or bearing portions of other roller members. The sliding mechanism of the embodiments of the present invention can also be applied to a conveying apparatus configured to convey an article including a paper medium etc., such as a 2D printer.

Example 1

A sliding mechanism illustrated in FIG. 1A and FIG. 1B was produced. It should be noted that a sliding member including two intervening members illustrated in FIG. 2A and FIG. 2B was used as the sliding member. The details of the members are shown in Table 1.

TABLE 1

|  | Material | Shape | Size |
| --- | --- | --- | --- |
| Shaft | SUS303 | Cylindrical shape | Diameter: 10 mm |
| Intervening member A | PTFE | Tubular shape | Inner diameter: 10.1 mm Thickness: 1 mm Outer diameter: 12.1 mm Length: 10 mm |
| Intervening member B | PEEK | Tubular shape | Inner diameter: 12.2 mm Thickness: 1 mm Outer diameter: 14.2 mm Length: 10 mm |
| Bearing | SUS304 | Tubular shape | Inner diameter: 14.3 mm Length: 10 mm |

It should be noted that the inner diameter of the intervening member A 21 is 101% with respect to the diameter of the shaft 1, and the outer diameter of the intervening member B 22 is 99.3% with respect to the inner diameter of the bearing 3.

The resultant sliding mechanism was measured for a friction coefficient. Specifically, the shaft 1 was allowed to rotate with a motor under the following conditions, and torque was measured. A load to be applied was measured concurrently with a load cell. The friction coefficient was calculated from the measured torque, the diameter of the shaft, and the load. In addition, the case where the amount of wear was small was evaluated as "○", and the case where the amount of wear was large was evaluated as "x". The results are shown in Table 2.
Shaft rotation speed: 100 rpm
Load: 20 N
Atmosphere: air atmosphere
Temperature: room temperature Example 2

A sliding mechanism was produced and evaluated in the same manner as in Example 1 except that the materials of the intervening member A 21, the intervening member B 22, and the bearing 3 were changed to POM, SUS304, and PTFE, respectively. The results are shown in Table 2.

Example 3

A sliding mechanism was produced and evaluated in the same manner as in Example 1 except that its sectional shape was changed as illustrated in FIG. 1D by using, as the intervening member A 21, a member having a length of 12 mm and including, on both ends, the flange portions 6 each having a thickness of 0.5 mm and projecting on the bearing 3 side. The results are shown in Table 2.

Example 4

A sliding mechanism was produced and evaluated in the same manner as in Example 1 except that the inner diameter of the bearing 3 was changed to 12.2 mm without forming the intervening member B 22. The results are shown in Table 2.

Example 5

A sliding mechanism was produced and evaluated in the same manner as in Example 4 except that the material of the intervening member A 21 was changed to SUS304, and a DLC film having a thickness of 2 μm was formed on the surfaces of the intervening member A 21 on the shaft 1 side and on the bearing 3 side. The results are shown in Table 2.

Comparative Example 1

A sliding mechanism was produced and evaluated in the same manner as in Example 1 except that the intervening member A 21 and the intervening member B 22 were not formed, and the material and inner diameter of the bearing 3 were changed to PTFE and 10.1 mm, respectively. The results are shown in Table 2.

Comparative Example 2

A sliding mechanism was produced and evaluated in the same manner as in Example 4 except that the materials of the intervening member A 21 and the bearing 3 were changed to SUS303 and POM, respectively. The results are shown in Table 2.

Comparative Example 3

A sliding mechanism was produced and evaluated in the same manner as in Example 4 except that the inner diameter of the bearing 3 was changed to 12.1 mm. The results are shown in Table 2.

TABLE 2

|  | Material of sliding surface | | | | | Evaluation | |
| --- | --- | --- | --- | --- | --- | --- | --- |
|  | Shaft | Intervening member A | Intervening member B | Bearing | Sectional shape | Friction coefficient | Wear |
| Example 1 | SUS303 | PTFE | PEEK | SUS304 | FIG. 1B | 0.06 | ○ |
| Example 2 | SUS303 | POM | SUS304 | PTFE | FIG. 1B | 0.08 | ○ |
| Example 3 | SUS303 | PTFE | PEEK | SUS304 | FIG. 1D | 0.06 | ○ |
| Example 4 | SUS303 | PTFE | — | SUS304 | FIG. 1B | 0.08 | ○ |
| Example 5 | SUS303 | DLC | — | SUS304 | FIG. 1B | 0.10 | ○ |
| Comparative Example 1 | SUS303 | — | — | PTFE | FIG. 1B | 0.16 | x |
| Comparative Example 2 | SUS303 | SUS303 | — | POM | FIG. 1B | 0.13 | x |
| Comparative Example 3 | SUS303 | PTFE | — | SUS304 | FIG. 1B | 0.16 | x |

As shown in Table 2, stable friction coefficients were obtained in Examples 1 to 5. In addition, also the amount of wear was observed to be small. The comparison between Example 1 and Example 4 reveals that a lower friction coefficient is obtained in Example 1, and the effects of the present invention are strongly exhibited when a plurality of intervening members are provided.

Figure 3:
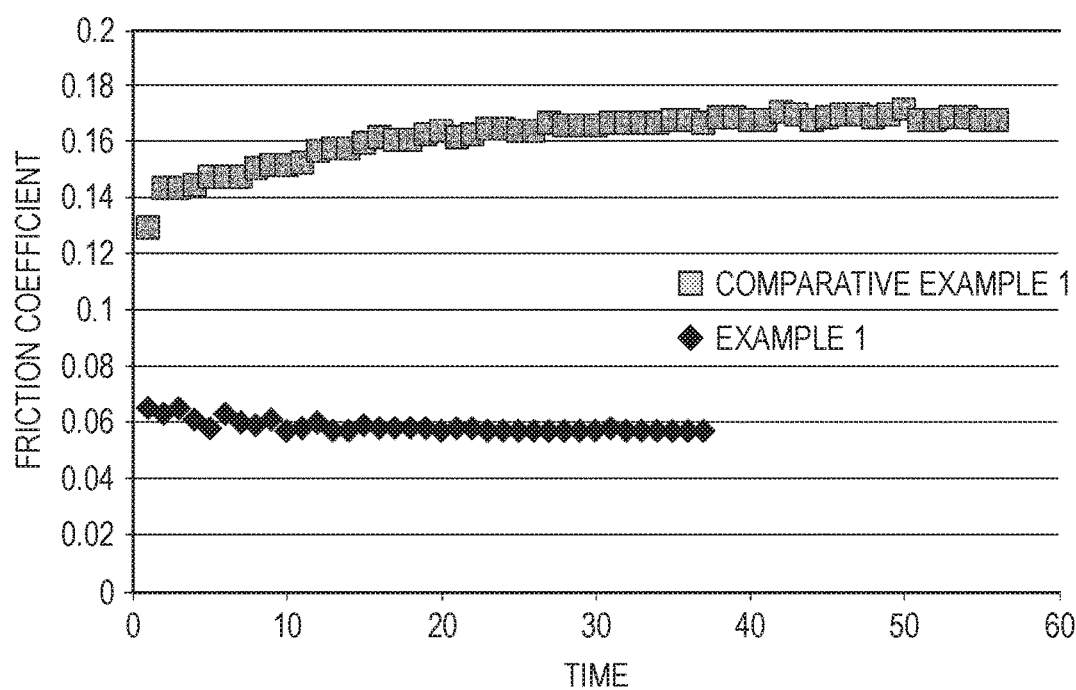
FIG. 3 is a graph for showing a change in friction coefficient in Example 1 and Comparative Example 1.

In addition, a change in friction coefficient with time in Example 1 and Comparative Example 1 is shown in FIG. 3. In Comparative Example 1, the intervening member was not formed, and hence the friction coefficient was not stable and showed a gradually increasing tendency in the test at high speed under high load. On the other hand, in Example 1, the friction coefficient was lower than that in Comparative Example 1 and almost constant.

In Comparative Example 2, the shaft 1 and the intervening member A 21 were formed of the same material, and hence the intervening member A 21 rotated integrally with the shaft 1 without sliding with respect to the shaft 1. Therefore, the friction coefficient was high, and the amount of wear was observed to be large.

In Comparative Example 3, a gap between the intervening member A 21 and the bearing 3 was eliminated, and hence the intervening member A 21 was nearly fixed to the bearing 3 to allow a configuration substantially the same as that in Comparative Example 1. Therefore, the friction coefficient was high, and the amount of wear was observed to be large.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050477, filed Mar. 13, 2015, which is hereby incorporated by reference herein in its entirety.

The invention claimed is:

1. A sliding part comprising:
   a shaft; and
   two or more intervening members, each located between the shaft and a bearing, and each being operable independently of the shaft and the bearing, the two or more intervening members having a first intervening member facing the shaft and a second intervening member having a surface facing the bearing,
   wherein at least one surface of the two or more intervening members on a shaft side comprises a sliding surface under one of a radial load and an axial load, and
   wherein a material for forming the first intervening member is different from a material for forming the second intervening member.

2. The sliding part according to claim 1, wherein:
   the shaft comprises a rotary shaft;
   at least one intervening member of the two or more intervening members is rotatable independently of the shaft and the bearing; and
   at least one surface of the at least one intervening member on the shaft side comprises a sliding surface under a radial load.

3. The sliding part according to claim 2, wherein the at least one intervening member is configured to rotate in a same direction as the shaft under a radial load.

4. The sliding part according to claim 1, wherein at least one intervening member of the two or more intervening members comprises a self-lubricating material.

5. The sliding part according to claim 4, wherein the self-lubricating material is selected from the group consisting of polyacetal, polytetrafluoroethylene, polyethylene, polyamide, polyimide, and polyphenylene sulfide.

6. The sliding part according to claim 1, wherein at least one intervening member of the two or more intervening members comprises a member in which a metal material has, on one surface or both surfaces thereof, a film formed of one of diamond-like carbon, $WS_2$, $MoS_2$, and graphite.

7. The sliding part according to claim 1, wherein a material for forming the sliding surface is different from a material for forming a surface facing the sliding surface.

8. The sliding part according to claim 1, wherein a friction coefficient on the sliding surface is different from a friction coefficient on a surface facing the sliding surface.

9. The sliding part according to claim 1, wherein a friction coefficient of the second intervening member on the surface facing the bearing is different from a friction coefficient of the bearing on a surface facing the second intervening member.

10. An apparatus comprising:
    the sliding part of claim 1; and
    a conveying mechanism configured to convey a sheet through utilization of rotation of the shaft in the sliding mechanism.

* * * * *